Patented Mar. 2, 1954

2,671,072

UNITED STATES PATENT OFFICE 2,671,072

DYE-RECEPTIVE ACRYLONITRILE POLYMERS

George E. Ham and Alfred B. Craig, Dayton, Ohio, assignors, by mesne assignments, to The Chemstrand Corporation, a corporation of Delaware No Drawing. Application May 26, 1951,
Serial No. 228,535

15 Claims. (Cl. 260—79.5)

This invention relates to polymeric compositions having unusual fiber-forming properties. More specifically, the invention relates to acrylonitrile polymers capable of being converted readily into dyeable general purpose fibers.

It is well known that polyacrylonitrile and various copolymers of acrylonitrile and other olefinic monomers, can be spun into synthetic fibers having unusual physical properties. Because polyacrylonitrile and many copolymers of acrylonitrile are almost inert chemically, conventional dyeing procedures are not universally useful in their processing. Many copolymers of acrylonitrile have been prepared using as comonomers substances which have dye affinity. Polymers of this type are not always satisfactory, because of the excessive cost of comonomers, and because the introduction of the comonomers often depreciates the desirable properties of the ultimate fibers.

One purpose of this invention is to provide new acrylonitrile polymers which have the usual physical properties of polyacrylonitrile, but which can easily be made completely dye-receptive. A further purpose of this invention is to provide a simple, practicable and inexpensive method of preparing dye-receptive acrylonitrile fibers. Further purposes of this invention will be evident from the description set forth hereinafter.

In accordance with this invention it has been found that acrylonitrile polymers having copolymerized therein alpha-chloroacrylic derivatives or containing blended therewith polymers of the alpha-chloroacrylic derivatives, may be rendered dye-receptive by after-treatment with reagents which convert the chlorine atom into an ionic chlorine radical. This invention contemplates using copolymers of 80 or more per cent of acrylonitrile and from two to 20 per cent of an alpha-chloroacrylate derivative, for example alkyl alpha-chloroacrylates, wherein the alkyl radical has up to four carbon atoms, such as methyl-alpha-chloroacrylate, ethyl-alpha-chloroacrylate, propyl-alpha-chloroacrylate, alpha-chloroacrylonitrile, and chloroacrylamide. The copolymers of acrylonitrile and the alpha-chloroacrylic compounds may, if desired, have copolymerized therewith other olefinic monomers for the purpose of further modifying the chemical and physical properties of the ultimate fibers.

Instead of the utilizing of copolymers of acrylonitrile and the chloroacrylic derivatives, the two critical monomers may each be present in different polymers which are blended physically. This procedure contemplates utilizing as the principal polymer polyacrylonitrile or copolymers of 90 per cent or more of acrylonitrile and minor proportions of one or more other monomers copolymerizable therewith, for example vinyl acetate, styrene, alpha-methylstyrene, alkyl maleates, alkyl fumarates, alkyl acrylates, alkyl methacrylates, methacrylonitrile, vinyl chloride and vinylidene chloride. The principal polymer is then blended with a minor proportion of a chlorine-containing copolymer of from 20 to 80 per cent of the said chloroacrylic acid derivative, and one or more other monomers copolymerizable therewith, for example, vinyl acetate, styrene, alpha-methylstyrene, alkyl maleates, alkyl fumarates, alkyl acrylates, alkyl methacrylates, methacrylonitrile, vinyl chloride and vinylidene chloride.

Both the copolymers and the blended polymers will be capable of conversion into dye-receptive polymers by conversion of the chlorine atom into an ionic chlorine radical, if a substantial portion of the chlorine-containing compound is present. It has been found that from two to 15 per cent of the total monomers present in polymeric form should be the chlorine-containing monomer. It will be apparent that the quantity of each copolymer blended will depend upon the proportion of chlorine-containing monomer in the reactive copolymer and the proportion should be so selected as to provide the requisite two to 15 per cent of the total monomers in the form of the chlorine-containing monomer.

In the practice of this invention, the copolymers or blended polymers are reacted with one of a variety of agents of the group of ammonia, amines, thioureas and 2-mercaptobenzothiazole, which will convert the chlorine-containing acrylic groups into an ionic form. Examples of such useful reagents are ammonia, primary, secondary, or tertiary amines, thiourea, alkyl thioureas, 2-mercaptobenzothiazole, or other basic mercaptans, tris(dimethylamido)phosphite, or tris(diethylamido)phosphite.

The copolymers and each of the polymeric components of the blended polymers can be prepared by any of the conventional polymerization methods, including mass, solution and aqueous dispersion techniques. The aqueous dispersion or emulsion procedures are generally preferred because they provide convenient industrially practicable methods for preparing high molecular weight polymers of uniform chemical and physical properties.

The aqueous dispersion polymerizations involve the use of free radical catalysts, for example, peroxides and azo compounds. The high acrylonitrile polymers preferably utilize water-soluble peroxides, such as the alkali metal or ammonium salts of persulfuric, perboric percarbonic or other peroxy acids.

The polymerization procedures may involve the use of emulsifying or dispersing agents. The high acrylonitrile fiber-forming polymers are readily formed in finely divided state with or without conventional dispersing agents, and when such dispersing agents are used, only minor proportions, for example from 0.01 to 0.5 per cent based on the total monomers being polymerized, need be employed. The dispersing or emulsifying agents are compounds which have both hydrophobic and hydrophilic functions, for example, salts of long chain carboxylic acids and mixtures thereof as obtained by saponification of animal and vegetable fats, salts of sulfonated hydrocarbons, particularly the alkylbenzene sulfonates, salts of the dialkyl sulfosuccinates, and salts of the aldehyde condensed naphthalenesulfonic acids. In the preparation of copolymers of more than 20 per cent of the alpha-chloroacrylic derivatives, the dispersing agents are frequently necessary, and the use of soap is preferred. Under the latter conditions a coagulating agent may be required to break the stable emulsion formed.

Although batch or continuous polymerization methods may be used, the preferred technique involves a semi-continuous procedure where a predetermined quantity of monomer or mixture of comonomers is added gradually to a reactor charged with the aqueous medium and containing catalyst and other essential reaction components. If desired, the catalyst and dispersing agent, if one is used, may be added gradually to the reaction medium during the course of polymerization. By maintaining in the reactor approximately the same concentrations of catalysts and each of the monomers, a substantially uniform rate of reaction and a uniform desirable product are achieved. A constant temperature of reaction further contributes to the uniformity of reaction conditions and the properties of the polymer.

The reaction may be conducted in glass or glass-lined reactors provided with stirring or other agitation mechanism. The reactors should preferably be provided with reflux condensers and means for adding the monomers and other reactants or reagents to the reactor, either at the beginning of the reaction or during the course of the polymerization. The polymers may be separated by conventional filtration apparatus, preceded by coagulation, if necessary.

In the practice of this invention the chloroacrylic radical-containing polymers may be treated in solid phase or in solution in suitable solvents, for example, dimethylacetamide, dimethylformamide, butyrolactone and ethylene carbonate.

The solid polymer or the fiber formed therefrom may be treated by a gaseous or a liquid reagent. The preferred process, however, involves the reaction between the reagent and the polymer in a liquid which is a solvent for both. The finished fiber may be treated as a continuous strand, in skeins, or in other packaged form, with gaseous reagent or with a liquid reagent or solution of any reagent to effect the desired conversion of the chlorine group to an ionic chlorine atom.

Under some circumstances some of the reagents may induce cross-linking of the polymer which can interfere with the efficient spinning of the polymer into fiber. Tertiary amines can be used in all of the described embodiments. The use of ammonia is of most value in the treatment of fibers. Primary and secondary amines frequently cause gelation when used in reactions involving polymer solutions of the compositions.

The polymers and solutions thereof are processed into fibers by conventional expedients and the details of such operation are not regarded as part of this invention.

Further details of the invention are set forth with respect to the following specific examples:

*Example 1*

A mixture of 93.5 parts of acrylonitrile, 6.5 parts of alpha-chloroacrylonitrile which contained, in addition 0.2 part of tertiary-dodecylmercaptan was gradually added to 370 parts of water and 0.1 part Acto 450 (a mahogany soap prepared by the sulfonation of a hydrocarbon fraction and obtained as a by-product in the refining of petroleum) in a glass reaction flask equipped with a condenser and stirrer over a period of two hours at 75° C. During this period 0.5 part of potassium persulfate was added, dissolved in 30 parts of water. After an additional reflux period of one-half hour the reaction mixture was steam-distilled to remove unreacted monomer, and the finely divided white copolymer was filtered, washed with water and dried. A 91.4 per cent conversion to a copolymer of 93.75 per cent acrylonitrile and 6.25 per cent alpha-chloroacrylonitrile was obtained. Fibers were obtained on spinning a 16 per cent solution in dimethylacetamide into a mixture of 60 per cent dimethylacetamide and 40 per cent water followed by washing in water, and stretching 320 per cent in a steam atmosphere.

A portion of the copolymer solution in dimethylacetamide was mixed with trimethylamine in an amount equivalent to the alpha-chloroacrylonitrile in the polymer. Fibers were spun from the treated solution by the method described in the preceding paragraph.

Using dyebaths containing two per cent Wool Fast Scarlet dye and ten per cent sulfuric acid (based on the weight of fiber being treated) and 41 cc. of water per gram of fiber, the fibers were heated for one hour at the boiling temperature. It was found that the fiber prepared from polymer which had been treated with trimethylamine was completely dye-receptive, but that the fiber from untreated polymer was nearly colorless after the same treatment.

*Example 2*

A 14 per cent solution of the copolymer described in the preceding example was mixed with a stoichiometric proportion of trimethylamine (based on the alpha-chloroacrylonitrile content). Films were cast from the solution and dried at 60° C. for 24 hours. Treatment in a dyebath, containing 0.1 gram of Wool Fast Scarlet dye, 0.5 gram sulfuric acid and 205 cc. of water for each gram of film, produced brilliant scarlet film.

The invention is defined by the following claims.

What we claim is:

1. A method of preparing a dye-receptive acrylonitrile polymer which comprises contacting a polymer of from 20 to 98 parts of acrylonitrile and from 2 to 80 parts of a compound of the group consisting of alpha-chloroacrylonitrile, alpho-chloroacrylamide, and the alkyl esters of alpha-chloroacrylic acid wherein the alkyl radicals contain up to 4 carbon atoms, with a reagent selected from the group consisting of ammonia, amines, thioureas and 2-mercaptobenzothiazole.

2. The method defined in claim 1 wherein the compound is alpha-chloroacrylonitrile.

3. The method as defined in claim 1 wherein the compound is alpha-chloroacrylamide.

4. The method as defined in claim 1 wherein the compound is methyl-alpha-chloroacrylate.

5. The method as defined in claim 1 wherein the compound is ethyl-alpha-chloroacrylate.

6. The method as defined in claim 1 wherein the compound is propyl-alpha-chloroacrylate.

7. The method as defined in claim 1 wherein the reagent is a tertiary aliphatic amine.

8. The method as defined in claim 1 wherein the reagent is thiourea.

9. The method as defined in claim 1 wherein the reagent is tris (dimethylamido) phosphite.

10. The method as defined in claim 1 wherein the reagent is 2-mercaptobenzothiazole.

11. A dye-receptive copolymer which comprises a salt prepared by reacting a copolymer of from 20 to 98 percent of acrylonitrile and from 2 to 80 percent by weight of a compound of the group consisting of alpha-chloroacrylonitrile, alpha-chloroacrylamide and the alkyl esters of alpha-chloroacrylic acid wherein the alkyl radical contains up to 4 carbon atoms, with a reagent selected from the group consisting of ammonia, amines, thioureas, and 2-mercaptobenzothiazole.

12. A dye-receptive copolymer which comprises a salt prepared by reacting a copolymer of from 20 to 98 percent of acrylonitrile and from 2 to 80 percent by weight of alpha-chloroacrylonitrile with trimethylamine.

13. A dye-receptive copolymer which comprises a salt prepared by reacting a copolymer of from 20 to 98 percent of acrylonitrile and from 2 to 80 percent by weight of alpha-chloroacrylonitrile with thiourea.

14. A dye-receptive copolymer which comprises a salt prepared by reacting a copolymer of from 20 to 98 percent of acrylonitrile and from 2 to 80 percent by weight of alpha-chloroacrylonitrile with tris (dimethylamido) phosphite.

15. A dye-receptive copolymer which comprises a salt prepared by reacting a copolymer of from 20 to 98 percent of acrylonitrile and from 2 to 80 percent by weight of alpha-chloroacrylonitrile with tris (diethylamido) phosphite.

GEORGE E. HAM.
ALFRED B. CRAIG.

References Cited in the file of this patent

UNITED STATES PATENTS

| Number | Name | Date |
|---|---|---|
| 2,384,889 | Clifford et al. | Sept. 18, 1945 |
| 2,436,926 | Jacobson | Mar. 2, 1948 |
| 2,497,526 | Arnold | Feb. 14, 1950 |